UNITED STATES PATENT OFFICE.

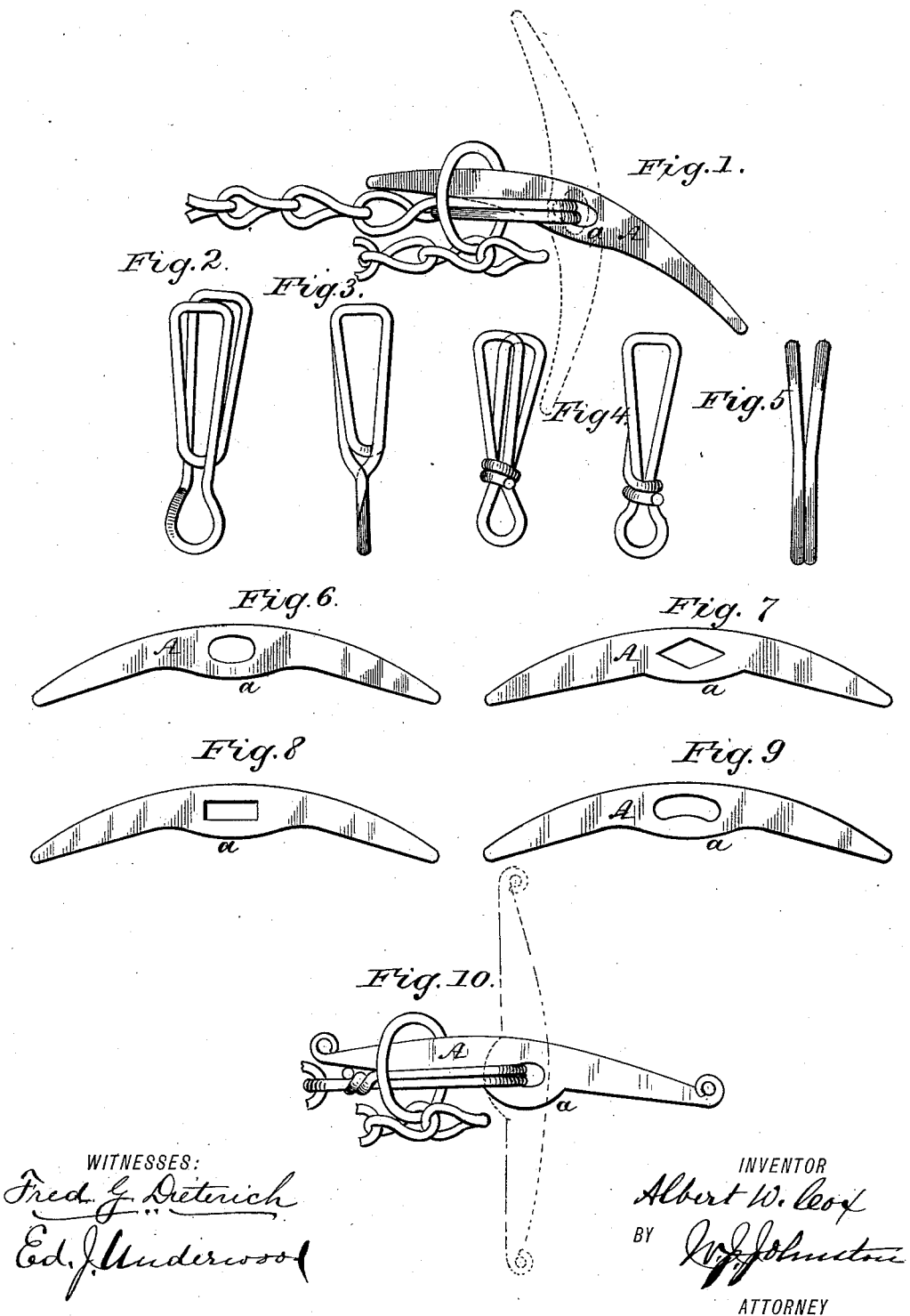

ALBERT WHITE COX, OF HASTINGS, NEBRASKA.

SPRING LINK AND BAR FOR CHAINS.

SPECIFICATION forming part of Letters Patent No. 347,421, dated August 17, 1886.

Application filed November 3, 1885. Serial No. 181,777. (No model.)

*To all whom it may concern:*

Be it known that I, ALBERT WHITE COX, a citizen of the United States, residing at Hastings, in the county of Adams and State of Nebraska, have invented certain new and useful Improvements in Spring Links and Bars for Chains; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in spring links and bars for chains, and is designed as an improvement upon the devices upon which Letters Patent Nos. 327,865 and 328,292 were heretofore granted to me.

It consists in certain details of construction and arrangement hereinafter described, and more specifically pointed out in the accompanying drawings, in which—

Figure 1 is a side elevation of my device attached to a chain; Figs. 2 and 3, detail views of my spring-link; Figs. 4 and 5, modifications of link; Figs. 6, 7, 8, and 9, views of the bar detached, showing modifications in the form of the slot therein. Fig. 10 is a view of a bar and link wherein the bar is straight, as in my former patents, and, while no part of the present invention, is given for the purpose of illustrating the improvement in the present form over the former.

The bar A is curved, and provided in its center with an elongated slot, which may be oblong, diamond-shaped, rectangular, or curved, as shown in Figs. 6, 7, 8, and 9, for the spring end of the link, and is provided with a shoulder, $a$, around which the link swings.

The link is formed of one piece of metal rod or wire bent, and preferably formed substantially as follows, but may be constructed as shown in Figs. 4 and 5: The end of the wire is passed through the slot in the bar, then bent at right angles and brought downward for a suitable distance and doubled back to the bar, through which it is again inserted and bent at right angles, as before, and the ends brought together at a suitable distance beyond the loop to form a ring and welded, the upper or double ends of the link thus formed being spread apart, so that they are in contact with the opposite ends of the slot in the bar, and thereby hold the bar in a position at right angles with the link and chain. The object of curving the bar as shown is to overcome a defect found to exist when the straight bar shown in Fig. 10, and covered by my former Letters Patent is used.

In the former construction it is found that when the bar is turned to a line with the link or chain for the purpose of inserting it through the holding-ring the double ends of the link are brought together at the center or narrow axis of the slot in the bar, and the force of the spring made to bear directly on opposite sides of the slot, as in Fig. 10, and thereby neutralized to a greater or less extent, so that it sometimes fails to force the bar back to its position at right angles with the chain until the dead-point is overcome by turning the bar slightly; but by curving the bar inwardly, as shown, it may be inserted through the holding-ring, while the double ends of the link occupy a position oblique to the line of the slot and bar, as in Fig. 1, and thus afford a leverage to the spring and enable it to exert its full force, so that when the bar is turned to a line with the chain for the purpose of inserting it through the holding-ring it instantly and automatically resumes its normal position at right angles with the chain on being released, thereby absolutely obviating any possibility of the chain becoming detached by the bar slipping through the ring accidentally.

Having thus described my invention, what I claim, and desire to secure by Letters Patent, is—

1. In a holding device for chains, a link composed of a single rod or wire bent to form a single holding-ring at one end and a double-looped spring at the other, with a single loop extending back into the interior of the link, in combination with a holding-bar having a central elongated slot, substantially as and for the purpose described.

2. In a holding device for chains, a curved bar provided with an elongated slot, in combination with a link formed of a single rod or wire bent to form a holding-ring at one end and a double-looped spring at the other, substantially as and for the purpose set forth.

In testimony whereof I affix my signature in presence of two witnesses.

ALBERT WHITE COX.

Witnesses:
D. H. BALLARD,
M. C. HESTER.